United States Patent
Lam et al.

(10) Patent No.: US 9,942,285 B2
(45) Date of Patent: Apr. 10, 2018

(54) TRANSFERRING FROM USER DEVICES WITH IMS-ENABLED CONNECTIONS TO USER DEVICES WITH NON-IMS-ENABLED CONNECTIONS

(71) Applicant: Verizon Patent and Licensing Inc., Arlington, VA (US)

(72) Inventors: Andrew Wahlon Lam, River Edge, NJ (US); Jason A. Coglon, Morristown, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 169 days.

(21) Appl. No.: 14/949,636

(22) Filed: Nov. 23, 2015

(65) Prior Publication Data

US 2017/0149850 A1    May 25, 2017

(51) Int. Cl.
*H04L 29/06* (2006.01)
*H04W 4/14* (2009.01)
*H04W 4/16* (2009.01)
*G06F 15/16* (2006.01)

(52) U.S. Cl.
CPC ...... *H04L 65/1096* (2013.01); *H04L 65/1006* (2013.01); *H04W 4/14* (2013.01); *H04W 4/16* (2013.01)

(58) Field of Classification Search
CPC ............. H04L 65/1006; H04L 65/1016; H04L 65/105; H04L 65/1073; H04L 65/1096; H04W 4/14; H04W 4/16; H04W 36/18; H04W 36/30; H04W 36/32; H04W 60/04; H04W 76/028; H04W 92/02
See application file for complete search history.

(56) References Cited

U.S. PATENT DOCUMENTS

| | | | |
|---|---|---|---|
| 8,055,248 B2 * | 11/2011 | Hicks, III | H04M 3/42246 455/415 |
| 8,942,709 B2 * | 1/2015 | Bonner | H04W 4/16 455/445 |
| 9,026,663 B2 * | 5/2015 | Mutikainen | H04L 65/1086 370/356 |
| 9,118,508 B2 * | 8/2015 | Bouthemy | H04W 88/16 |
| 9,247,418 B2 * | 1/2016 | Lau | H04W 8/20 |

(Continued)

OTHER PUBLICATIONS

J. Rosenberg et al., "An Invite-Initiated Dialog Event Package for the Session Initiation Protocol (SIP)," Network Working Group Request for Comments 4235, Nov. 2005.

*Primary Examiner* — Alpus H Hsu (57) ABSTRACT

Techniques described herein may be used to enable a user to have a call transferred between user devices regardless of how the user devices are connected to a wireless telecommunications network. For example, a user may register a first and second user device for a service that allows calls to be transferred between the user devices. A server may detect a call involving the first user device and may identify the second user device based on the prior registration. The server may detect a type of connection between the second user device and the wireless telecommunications network and may notify the second user device of the call based on the type of connection detected. In response to the notification, the user may request that the call be transferred to the second user device, and the server may cause the call to be transferred accordingly.

20 Claims, 7 Drawing Sheets

(56) References Cited

U.S. PATENT DOCUMENTS

| | | | |
|---|---|---|---|
| 9,426,643 B2* | 8/2016 | Gaviria | H04L 65/1016 |
| 9,473,872 B2* | 10/2016 | Kaura | H04W 4/001 |
| 9,560,515 B2* | 1/2017 | Brianza | |
| 2008/0186956 A1* | 8/2008 | Yeoum | H04L 12/66 370/352 |
| 2010/0232417 A1* | 9/2010 | Segre | H04M 7/123 370/352 |
| 2011/0106958 A1* | 5/2011 | Thompson | H04W 4/00 709/230 |
| 2011/0249626 A1* | 10/2011 | Cao | H04L 51/38 370/328 |
| 2012/0072601 A1* | 3/2012 | Bharadwaj | H04L 65/1016 709/228 |
| 2013/0024574 A1* | 1/2013 | Lau | H04L 65/1069 709/227 |
| 2013/0171974 A1* | 7/2013 | Bae | H04W 8/12 455/411 |
| 2015/0201086 A1* | 7/2015 | Abi | H04M 7/006 370/352 |
| 2015/0208446 A1* | 7/2015 | Yeoum | H04L 65/1046 370/329 |
| 2015/0350983 A1* | 12/2015 | Kwok | H04L 65/1069 370/331 |
| 2016/0021579 A1* | 1/2016 | Mufti | H04W 36/0022 370/331 |
| 2016/0142536 A1* | 5/2016 | Bendi | H04M 3/4288 455/411 |
| 2016/0248814 A1* | 8/2016 | Mufti | H04L 65/1006 |
| 2016/0315978 A1* | 10/2016 | Jacobsohn | H04L 65/1016 |

* cited by examiner

TRANSFERRING FROM USER DEVICES WITH IMS-ENABLED CONNECTIONS TO USER DEVICES WITH NON-IMS-ENABLED CONNECTIONS

BACKGROUND

User devices (e.g., smartphones, tablet computers, etc.) may enable users to communicate with one another via a network (e.g., a wireless telecommunications network, the Internet, etc.). Some network service providers may enable users to associate a smartphone with other user devices so that the user may make calls using any of the user devices as though the call was being made from the smartphone. Additionally, some service providers may enable the user to switch between user devices during a call. For instance, during a call initiated with a tablet computer, the user may have the call transferred to the user's smartphone.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

As described above, some network service providers may enable users to register a mobile device number (MDN) of one user device (UE) (e.g., a smartphone) with one or more other UEs (e.g., another smartphone, a tablet computer, a laptop computer, etc.), such that the user may make calls from any of the UEs as though the call was being made from the UE of the registered MDN. The user may also be able to have the call transferred from one UE to another UE while the call is ongoing. However, currently available solutions for transferring a call between UEs include certain limitations. For example, before a call can be transferred from a first UE to a second UE, the second UE may need to be notified about the call, and current techniques for notifying the second UE may include sending a Session Initiation Protocol (SIP) message to the second UE. However, the second UE may only receive the SIP message if the second UE has a network connection (e.g., a 4th Generation (4G) connection) that enables the second UE to be registered with an Internet Protocol (IP) Multimedia Subsystem (IMS). As such, if the second UE has limited network connectivity (e.g., a Single-Carrier Radio Transmission Technology (1×) connection, a 2nd Generation (2G) connection, a 3rd Generation (3G) connection, etc.), the second UE may not be capable of receiving SIP messages, and may, therefore, remain unaware of the ongoing call and incapable of having the call transferred to the second UE.

Techniques described herein may be used to enable a call to be transferred from the first UE to the second UE even when the second UE has a non-IMS-enabled connection (e.g., a 1× connection, a 2G connection, a 3G connection, etc.). For example, a user may register a smartphone and a tablet computer for a network service that enables the tablet computer to make calls using the MDN of the smartphone. At some point thereafter, the user may use the tablet computer to call another user device just as the user could with the smartphone. In response to the call, a network device (e.g., a telephone application server (TAS)) may determine the connection status of the smartphone (e.g., determine whether the smartphone has an IMS-enabled connection) and may determine a suitable way to communicate with the smartphone based on the determined connection status.

In some implementations, the network device (e.g., the TAS) may determine whether the smartphone has an IMS-enabled connection by, for example, determining whether the smartphone is registered for IMS services. For instance, the smartphone may be registered for IMS services when the smartphone includes a 4G connection. By contrast, the smartphone may not be registered for IMS services if the smartphone has a 1×, a 2G, or a 3G connection.

For instance, if the smartphone has an IMS-enabled connection (e.g., a 4G connection), the network may notify the smartphone of the ongoing call using a SIP message. However, if the smartphone has a non-IMS-enabled connection (e.g., a 1× connection, a 2G connection, a 3G connection, etc.), the network may notify the smartphone of the ongoing call using a Simple Messaging Service (SMS) message, a Multimedia Messaging Service (MMS) message, and/or some other type of message (e.g., some type of message other than a SIP message). The notification may inform the smartphone of the call and how to cause that the call be transferred to the smartphone (e.g., by replying to the SMS message). If the user responds to the notification accordingly (e.g., by replying to the SMS message via the smartphone, the network may transfer the call from the tablet computer to the smartphone. As such, the techniques described herein may expand the scenarios in which a user may have a call transferred from one UE to another UE by communicating with UEs in a manner that is germane to the current connection status of the UE.

Figure 1:
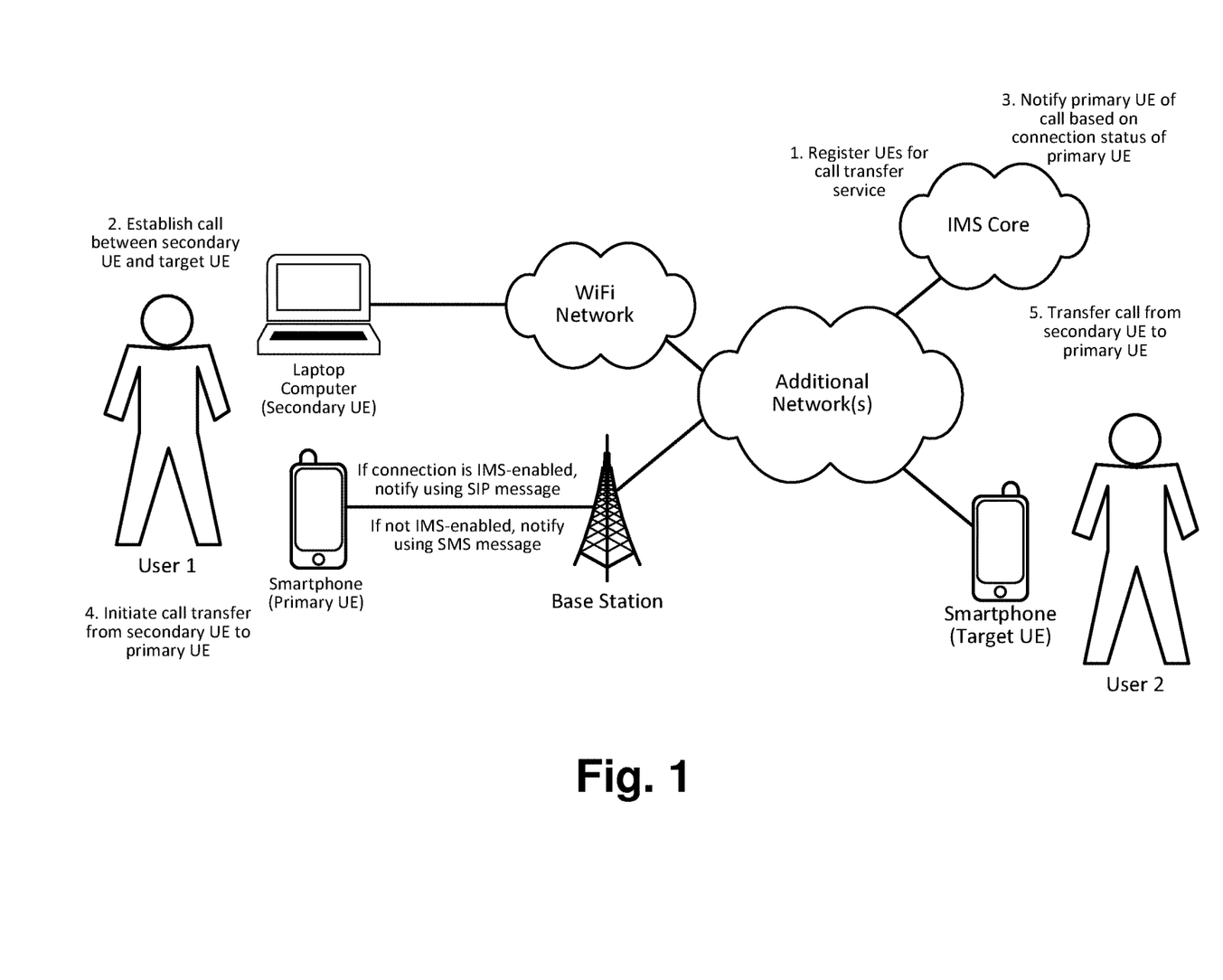
FIG. 1 illustrates example overview of an implementation described herein.

FIG. 1 illustrates example overview of an implementation described herein. As shown, a user (e.g., User 1) may own multiple UEs, such as a smartphone and a laptop computer. The smartphone may be connected to a base station, and the laptop computer may be connected to another type of access network, such as a WiFi network. The base station and the WiFi network may, in turn, be connected to one or more other networks, such as a service provider network, the Internet, etc. User 1 may contact an IMS core operated by the network service provider in order to register the smartphone and the laptop computer for a service that will enable the user to make calls from either the smartphone or the laptop computer (as though the call was being made from the smartphone) (at 1). As used herein, a UE (such as a smartphone) that is capable of making calls with its own MDN (e.g., a UE for which the MDN has been provisioned by a wireless telecommunications network provider) may be referred to as a primary UE, whereas a UE (such as a laptop computer) that is capable of making calls using the MDN of a primary UE may be referred to as a secondary UE.

User 1 may establish a call with the UE of another user (e.g., User 2) (at 2). Since the call may be transferred to the smartphone of User 1 at some point, the IMS core may determine the connection status of the smartphone and, based on the connection status, notify the smartphone about the call accordingly (at 3). For instance, if the smartphone of User 1 is connected to a base station via a 4G or Long-Term Evolution (LTE) connection, the IMS may notify the smartphone via SIP messaging. However, if the smartphone only has a 1× connection, a 2G connection, or a 3G connection, then the IMS may notify the smartphone in another way, such as SMS messaging. The information sent by the IMS core may enable User 1 to have the call transferred to the smartphone by, for example, pressing a button presented to the user in a user interface (UI) of the smartphone. As such, User 1 may request that the call be transferred to his or her smartphone (at 4), and the IMS core may respond to the request by having the call transferred from the laptop computer to the smartphone of User 1 (at 5).

Figure 2:
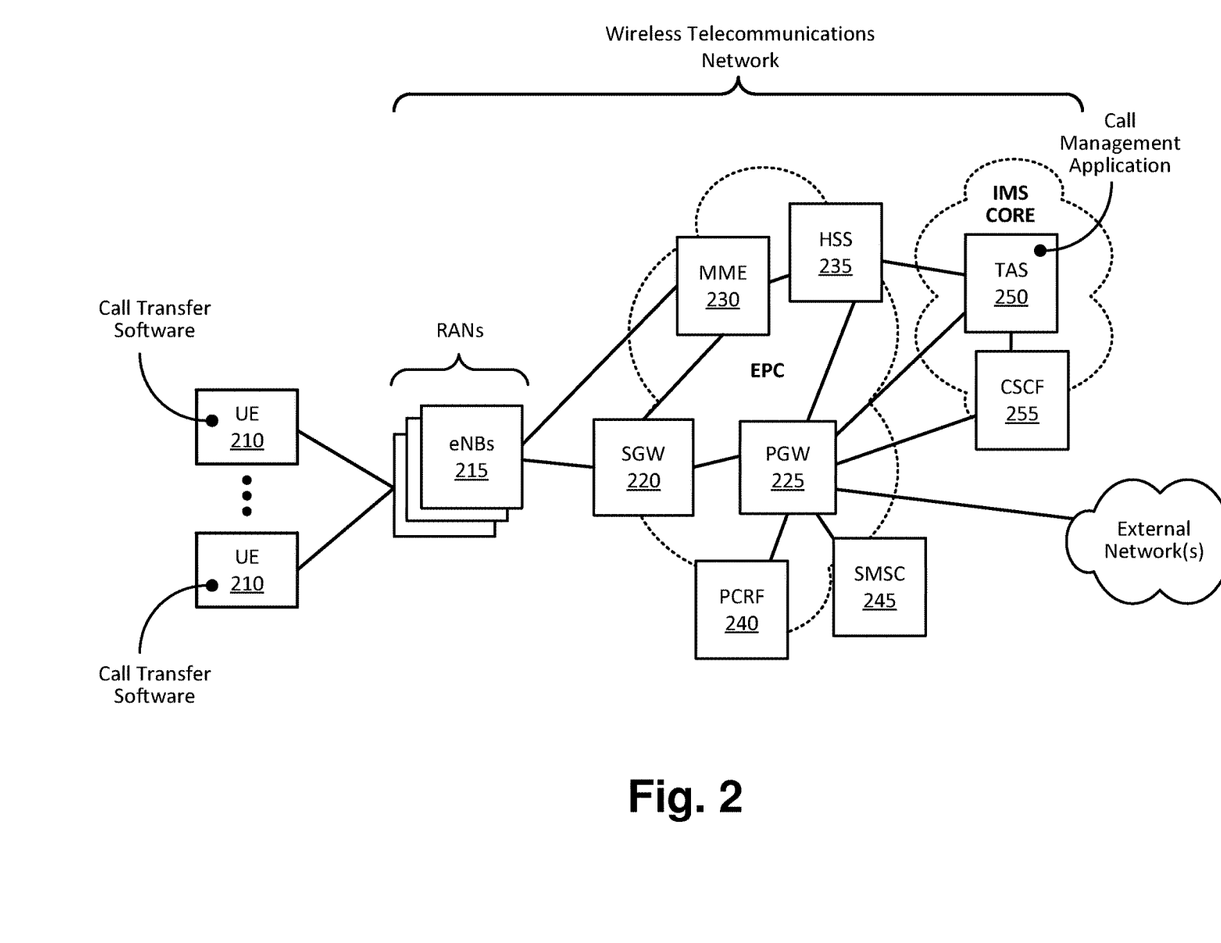
FIG. 2 is a diagram of an example environment in which systems and/or methods described herein may be implemented.

FIG. 2 is a diagram of an example environment 200 in which systems and/or methods described herein may be implemented. Environment 200 may include user equipment (UEs) 210, one or more radio access networks (RANs), a wireless telecommunications network, and one or more external networks. The wireless telecommunications network may include an Evolved Packet System (EPS) that includes a Longer Term Evolution (LTE) network and/or an evolved packet core (EPC) network that operates based on a 3rd Generation Partnership Project (3GPP) wireless communication standard. The LTE network may be, or may include, RANs that include one or more base stations, some or all of which may take the form of enhanced Node Bs (eNBs) 215, via which UEs 210 may communicate with the EPC network.

The EPC network may include Serving Gateway (SGW) 220, Packet Data Network (PDN) Gateway (PGW) 225, Mobility Management Entity (MME) 230, Home Subscriber Server (HSS) 235, Policy and Charging Rules Function (PCRF) 240, and/or SMS Center (SMSC) 245. As shown, the EPC network may enable UEs 210 to communicate with an external network, such as a Public Land Mobile Networks (PLMN), a Public Switched Telephone Network (PSTN), and/or an IP network (e.g., the Internet).

The wireless telecommunications network may also include an IMS core, which may include TAS 250 and Call Session Control Function (CSCF) 255. In some implementations, the IMS core may include additional devices, such as an HSS server, media servers, additional application servers, etc. The IMS core may help deliver IP multimedia services, such as Voice over IP (VoIP) services, video calling services, etc., to UEs 210. Additionally, the IMS core may operate based on the 3GPP wireless communication standard.

UE 210 may include a portable computing and communication devices, such as a personal digital assistant (PDA), a smart phone, a cellular phone, a laptop computer with connectivity to the wireless telecommunications network, a tablet computer, etc. UE 210 may also include a non-portable computing device, such as a desktop computer, a consumer or business appliance, a smart television, or another device that has the ability to connect to the wireless telecommunications network. UE 210 may also include a computing and communication device that may be worn by a user (also referred to as wearable devices) as a watch, a fitness band, a necklace, glasses, an eyeglass, a ring, a belt, a headset, or another type of wearable device.

UE 210 may include call transfer software that may enable UE 210 to perform one or more of the operations described herein, such as receiving a notice of an ongoing call involving a related UE 210, requesting that the call be transferred to UE 210, and establishing a call that is transferred from the related UE 210. In some implementations, when UE 210 receives a SMS message, the call transfer software may present the message or notification to the user in the same manner as a SIP message would be presented to the user. As such, the user may be unaware of whether the notification was a SIP message, a SMS message, or another type of message.

eNB 215 may include one or more network devices that receive, process, and/or transmit traffic, such as voice calls and data, destined for and/or received from UE 210. eNB 215 may receive traffic from and/or send traffic to external networks or other devices via SGW 220 and PGW 225. eNB 215 may send traffic to and/or receive traffic from UEs 210 via an air interface.

SGW 220 may aggregate traffic received from one or more eNBs 215 and may send the aggregated traffic to another network or device via PGW 225. Additionally, SGW 220 may aggregate traffic received from one or more PGWs 225 and may send the aggregated traffic to one or more eNBs 215. SGW 220 may operate as an anchor for the user plane during inter-eNB handovers and as an anchor for mobility between different telecommunication networks. PGW 225 may include one or more network devices that may aggregate traffic received from one or more SGWs 220, and may send the aggregated traffic to an external network or another device. PGW 225 may also, or alternatively, receive traffic from an external network and may send the traffic toward UE 210 (via SGW 220 and/or eNB 215).

MME 230 may include one or more computation and communication devices that act as a control node for eNB 215 and/or other devices that provide the air interface for the wireless telecommunications network. For example, MME 230 may perform operations to register UE 210 with the wireless telecommunications network, to establish bearer channels (e.g., traffic flows) associated with a session with UE 210, to hand off UE 210 to a different eNB, MME, or another network, and/or to perform other operations. MME 220 may perform policing operations on traffic destined for and/or received from UE 210.

HSS 235 may include one or more devices that may manage, update, and/or store, in a memory associated with HSS 235, profile information associated with a subscriber (e.g., a subscriber associated with UE 210). The profile information may identify applications and/or services that are permitted for and/or accessible by the subscriber; a Mobile Directory Number (MDN) associated with the subscriber; bandwidth or data rate thresholds associated with the applications and/or services; and/or other information. The subscriber may be associated with UE 210. Additionally, or alternatively, HSS 235 may perform authentication, authorization, and/or accounting operations associated with the subscriber and/or a communication session with UE 210.

PCRF 240 may include one or more devices that may receive information regarding policies and/or subscriptions from one or more sources, such as subscriber databases and/or from one or more users. PCRF 240 may provide these policies to PGW 225 or another device so that the policies can be enforced. As depicted, in some implementations, PCRF 240 may communicate with PGW 225 to ensure that charging policies are properly applied to locally routed sessions within the telecommunications network. For instance, after a locally routed session is terminated, PGW 225 may collect charging information regarding the session and provide the charging information to PCRF 240 for enforcement.

SMSC 245 may include one or more devices that may store, forward, convert, and deliver SMS messages. In some implementation, SMSC 245 may respond to instructions from TAS 250 to send a SMS message to UE 210 regarding an ongoing call. The SMS message may notify UE 210 of the ongoing call and/or provide UE 210 with information on how to have the call transferred to the UE 210 receiving the SMS message. In some implementations, SMSC 245 may receive a SMS message from UE 210. The SMS message may include a request to have an ongoing call transferred to the UE 210 sending the SMS message. SMSC 245 may relay the request to the IMS core (e.g., to TAS 250) in order for the request to be carried out. In some implementations, the wireless telecommunications network may include one or more other types of messaging servers (in addition to or on lieu of SMSC 245), such as a Multimedia Messaging Service Center (MMSC) or some other type of messaging server that sends messages in accordance with implementations described herein.

TAS 250 may include one or more computation and communication devices that may provide IP call (e.g., VoIP) services. TAS 250 may translate a telephone number into an IP address and/or an IP address into a telephone number in order to establish a call. TAS 250 may also provide call routing and/or call bridge services. TAS 250 may also provide answering services, call forwarding services, and free-call routing services (e.g., for so-called "1-800" numbers). TAS 250 may operate based on a particular communication protocol, such as SIP. In some implementations, TAS 250 may include software, such as a call management application, that enables TAS 250 to perform one or more of the operations described herein, such as determining the connection status of UE 210, determining how to notify UE 210 of an ongoing call based on the connection status of UE 210 (e.g., by using SIP messaging, SMS messaging, etc.), and/or causing calls to be transferred from one UE 210 to another UE 210.

CSCF 255 may include one or more computation and communication devices that may gather, process, search, store, and/or provide information in a manner described herein. CSCF 255 may process and/or route calls to and from UE 210 via the EPC. For example, CSCF 255 may process calls, received from an external network, that are destined for UE 210. In another example, CSCF 255 may process calls, received from UE 210, that are destined for the external network.

The quantity and arrangement of devices and/or networks, illustrated in FIG. 2 is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices illustrated in FIG. 2 may perform one or more functions described as being performed by another one or more of the devices illustrated in FIG. 2. The illustrated devices may interconnect via wired connections, wireless connections, or a combination of wired and wireless connections.

Figure 3:
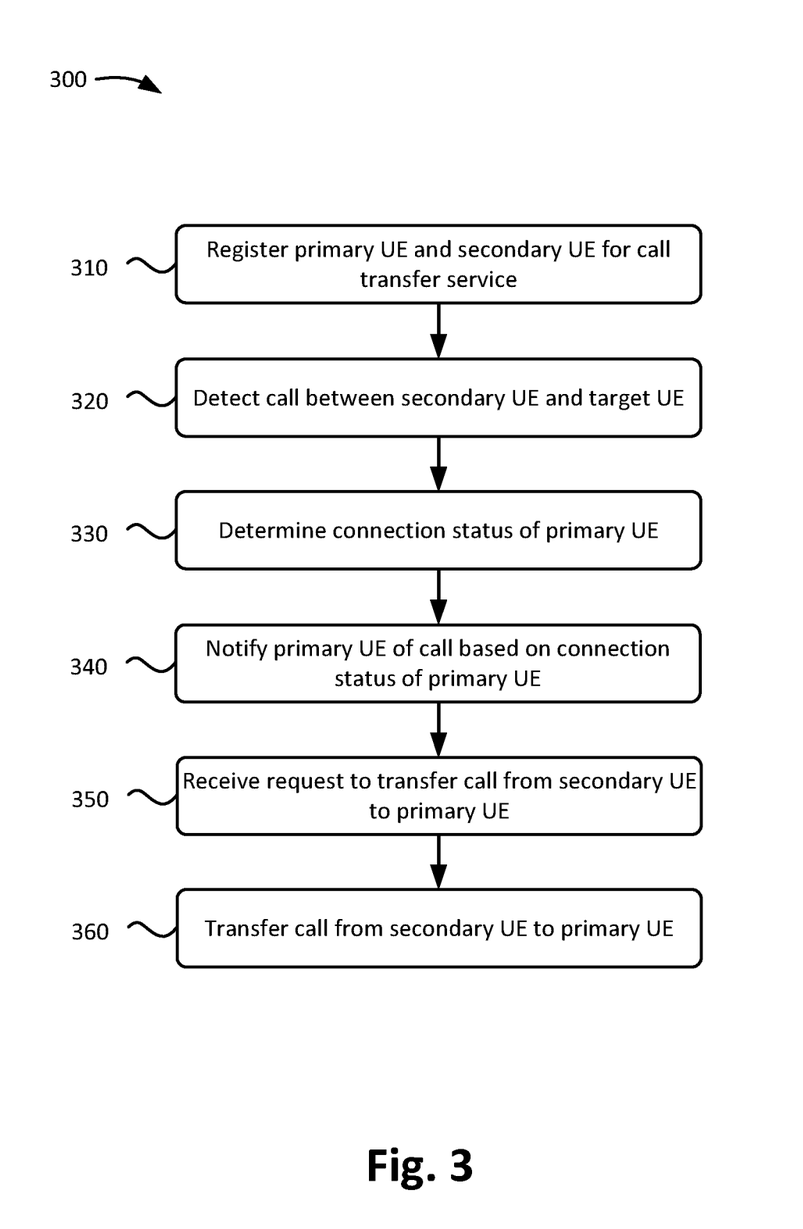
FIG. 3 is a flowchart diagram of an example process for transferring a call between user devices (UEs)

FIG. 3 is a flowchart diagram of an example process 300 for transferring a call between UEs 210. In some implementations, process 300 may be implemented by TAS 250. In some implementations, process 300 may be implemented by one or more of TAS 250, CSCF 255, and/or one or other devices.

By way of a non-limiting example, the following description refers to a primary UE 210, a secondary UE 210, and a target UE 210, which may each be an example of UE 210 described above with reference to FIG. 2. In some implementations, primary UE 210 may include a smartphone or another type of UE that has its own MDN for making and receiving calls, whereas secondary UE 210 may include a UE that is using the MDN of primary UE 210 to make calls. Primary UE 210 and secondary UE 210 may each be owned and/or operated by the same user. Target UE 210 may correspond to a UE of another user with whom the user of primary UE 210 and secondary UE 210 has, or intends to, establish a call.

As shown, process 300 may include registering primary UE 210 and secondary UE 210 for a call transfer service (block 310). For example, a user may access a network service (e.g., via a website) capable of extending the calling capabilities of one UE (e.g., a smartphone) to other UEs (e.g., a tablet computer, a laptop computer, a wearable device, etc.). With such a service enabled, a tablet computer may be capable of making and receiving calls using the MDN of the smartphone. When a call is made using the tablet computer, it may appear to the device being called (the "target" device) that the call is coming from the smartphone. Additionally, when an incoming call is directed to the MDN of the smartphone, both the tablet computer and the smartphone may ring in response to the incoming call. Enabling the call transfer service may also permit a user to have an ongoing call dynamically switched from one UE (e.g., the tablet computer) to another UE (e.g., the smartphone).

While some implementations described herein refer to primary UEs 210 and secondary UEs 210, in some implementations, UEs 210 may not actually be designated as primary and/or secondary by TAS 250. Instead, TAS 250 may differentiate between UEs 210 (e.g., whether a particular UE is a primary UE or a secondary UE) based on whether a particular UE 210 has its own MDN for making calls or is using the MDN of another UE 210 to make calls. Additionally, or alternatively, TAS 25 may differentiate between UEs 210 based on whether a particular UE 210 is capable of connecting to the wireless telecommunications network via eNB 215 or instead of only via a WiFi connection or a wired connection. As such, in some implementations, labeling UEs 210 as primary or secondary UEs 210 may actually be a substantive feature of the implementation, whereas in other implementations, primary and secondary UEs 210 may merely be used herein for illustrative purposes.

Process 300 may also include detecting a call between a secondary UE 210 and a target UE 210 (block 320). For example, once a particular UE 210 has registered for the call transfer service discussed above, TAS 250 may be notified when the particular UE 210 is involved in a call with another UE (e.g., target UE 210). In some implementations, being aware of a registered UE 210 participating in a call may enable TAS 250 to notify other UEs 210 (e.g., UEs 210 that were registered with the UE 210 participating in the call) of the call and/or enable the other UEs 210 to have the call transferred to one of the other UEs 210.

Process 300 may also include determining a connection status of primary UE 210 (block 330). For example, TAS 250 may determine a connection type corresponding to a connection between primary UE 210 and a wireless telecommunications network. The connection type may indicate whether or not primary UE 210 is capable of receiving SIP messages. Examples of connection types that are capable of receiving SIP messages may include a 4G connection, a 5G connection, and a WiFi connection. Examples of connection types that are not capable of receiving SIP messages may include a 1x connection, a 2G connection, and a 3G connection.

In some implementations, the information indicating the connection status may correspond to a measurement report prepared by UE 210 and sent to eNB 215. In some implementations, the information may be from another source. For instance, TAS 250 may send a request to UE 210 for an indication of the connection status, and UE 210 may respond to the request with the requested information. In some implementations, TAS 250 may determine that primary UE 210 may not be capable of receiving SIP messages when primary UE 210 is roaming (e.g., regardless of whether the connection is a 4G connection).

Process 300 may include notifying primary UE 210 of the call based on the connection status of primary UE 210 (block 340). For example, TAS 250 may notify primary UE 210 of the ongoing call based on the type(s) of information that primary UE 210 is capable of receiving. For instance, if UE 210 has a 4G connection with eNB 215, TAS 250 may use a SIP message to notify UE 210 about the call. By contrast, if UE 210 has a 1x connection with eNB 215, TAS 250 may use an SMS message or an MMS message to notify UE 210 about the call.

In some implementations, while the form and format of the information sent to primary UE 210 may differ depending on the connection status, the substance of the information may be the same or similar. Additionally, in some implementations, UE 210 may not have a connection with eNB 215 but instead may have another type of connection (e.g., a connection that includes a WiFi connection) with the wireless telecommunications network. In such implementations, UE 210 may be notified of the ongoing call using an IP protocol message (such as an email message, an instant message, a proprietary message (e.g., a message that is particular to the call transfer application), etc.

For example, whether TAS 250 sends an SIP message or a SMS message, TAS 250 may inform primary UE 210 of the ongoing call and enable primary UE 210 to have the call transferred to primary UE 210. For instance, a SMS message sent to primary UE 210 regarding the call may include the payload of the SIP message that would have been sent to primary UE 210 had the connection status of primary UE 210 supported SIP messaging.

In some implementations, when primary UE 210 is notified via a SMS message, the SMS message may include an instruction for the user to reply to the SMS message with another SMS message that includes a particular code or command. In some implementations, the instructions for the user to reply may include instruction to reply to a particular address (e.g., a particular IP address) and/or a specified form of communication. For example, the user may be instructed to reply to an SMS message with a MMS message. As another example, the user may be instructed to reply to an SMS message using a different number (e.g., telephone number) than the number used to send the SMS message to primary UE 210.

In some implementations, the notification may be presented to the user in the same way (e.g., via the call transfer application) regardless of the type of message used to send the notification. For example, the call transfer application may be capable of intercepting the SMS message so that the SMS message is not displayed to the user using the traditional SMS interface. Instead, the call transfer application may use the content of the SMS message to notify (via an interface of the call transfer application) the user of the ongoing call and/or ability of the user to have the call transferred to the primary UE 210. In some implementations, the call transfer application may have its own IP address and port number via which IP messages can be received.

Process 300 may also include receiving a request to transfer the call from secondary UE 210 to primary UE 210 (block 350). For instance, TAS 250 may receive a request from primary UE 210 to have the ongoing call, involving secondary UE 210 and target UE 210, transferred from secondary UE 210 to primary UE 210. Additionally, the type of message used to send the notification may inform primary UE 210 about how to send the request. For instance, if the notification is received via SIP messaging, primary UE 210 may send the request for the call to be transferred via SIP messaging. Similarly, if the notification is received via SMS messaging, primary UE 210 may send the request for the call to be transferred via SMS messaging (or in whatever format is specified by the notification).

Process 300 may also include transferring the call from the secondary UE 210 to primary UE 210 (block 360). For example, TAS 250 may cause a call between secondary UE 210 and target UE 210 to be transferred from secondary UE 210 to primary UE 210. In some implementations, after the transfer is complete, the call may only be between primary UE 210 and target UE 210 such that secondary UE 210 may no longer be part of the call. Additionally, TAS 250 may send a message to secondary UE 210 indicating that the call may be transferred back to secondary UE 210 if/when the user decides to do so. In some scenarios, the user may cause the call to be transferred back to secondary UE 210 in a similar manner as the user caused the call to be transferred from secondary UE 210 to primary UE 210 (e.g., by selecting a button in a UI of secondary UE 210, by sending a SMS message from secondary UE 210 to TAS 250, etc.).

Additionally, in some implementations, TAS 250 may notify the user of the ability to have the call transferred to primary UE 210 by notifying the secondary UE 210 involved in the call accordingly. In some implementations, TAS 250 may provide a list of each UE 210 to which the call may be transferred, and the user may cause the call to be transferred by selecting a particular UE 210 in the list. As such, by interacting with secondary UE 210, the user may have the call "pushed" to another UE 210 (e.g., primary UE 210), and/or by interacting with another UE 210 (e.g., primary UE 210), the user may have the call "pulled" to the other UE 210.

Figure 4:
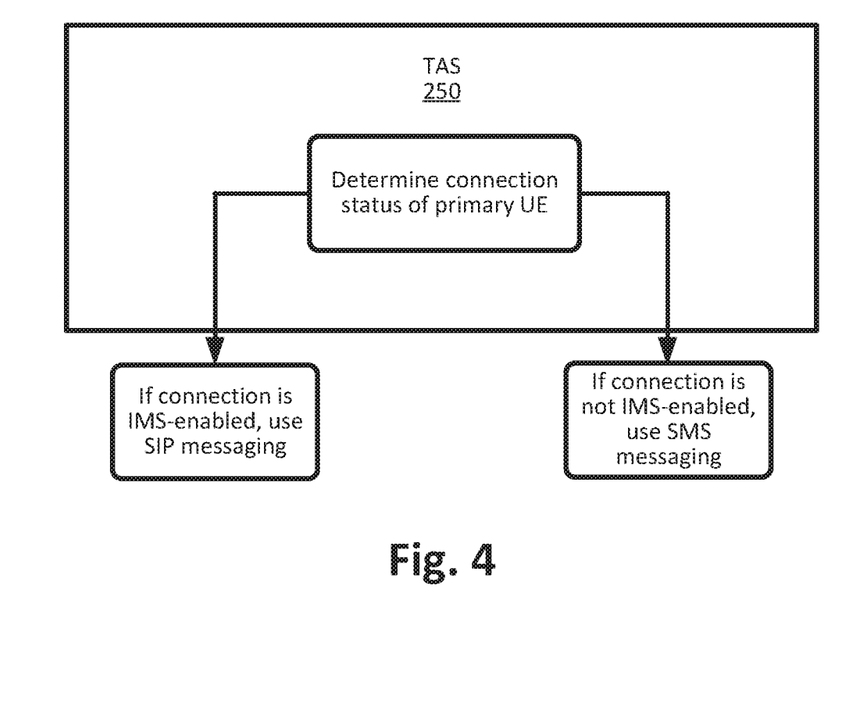
FIG. 4 is a logical flow diagram of an example for enabling a UE to request that a call be transferred to another UE.

FIG. 4 is a logical flow diagram of an example for enabling UE 210 to request that a call be transferred to UE 210. As depicted, TAS 250 may determine a connection status corresponding to a particular UE 210 that has been registered for a call transfer service that enables a user to have an ongoing call involving a first UE 210 of the user to be dynamically transferred to a second UE of the user 210. TAS 250 may notify the second UE 210 of the ongoing call involving the first UE 210 and/or may inform the user of the first and second UEs 210 how to cause the call to be transferred from the first UE 210 to the second UE.

When the connection status of the second UE 210 includes an IMS-enabled connection (e.g., a 4G connection, a 5G, connection, or another type of connection that enables the UE to receive IMS services), TAS 250 may inform the second user deice 210 using a SIP message. However, when the connection status of the second UE 210 does not include an IMS-enabled connection (e.g., a 1× connection, a 2G connection, a 3G connection, or another type of connection that does not enable the UE to receive IMS services), TAS 250 may inform the second user deice 210 using a non-SIP message, such as a SMS message. In some implementations, TAS 250 may identify all the UEs 210 (e.g., second UE 210, third UE 210, fourth UE 210, etc.) that are associated with first UE 210. In such scenarios, TAS 250 may determine the connection status of each of the identified UEs 210 and enable each of the identified UEs 210 to cause the call to be transferred to the respective UE 210 by notifying each of the identified UEs 210 about the call in a manner that is consistent with a connection status of each particular UE 210.

Figure 5:
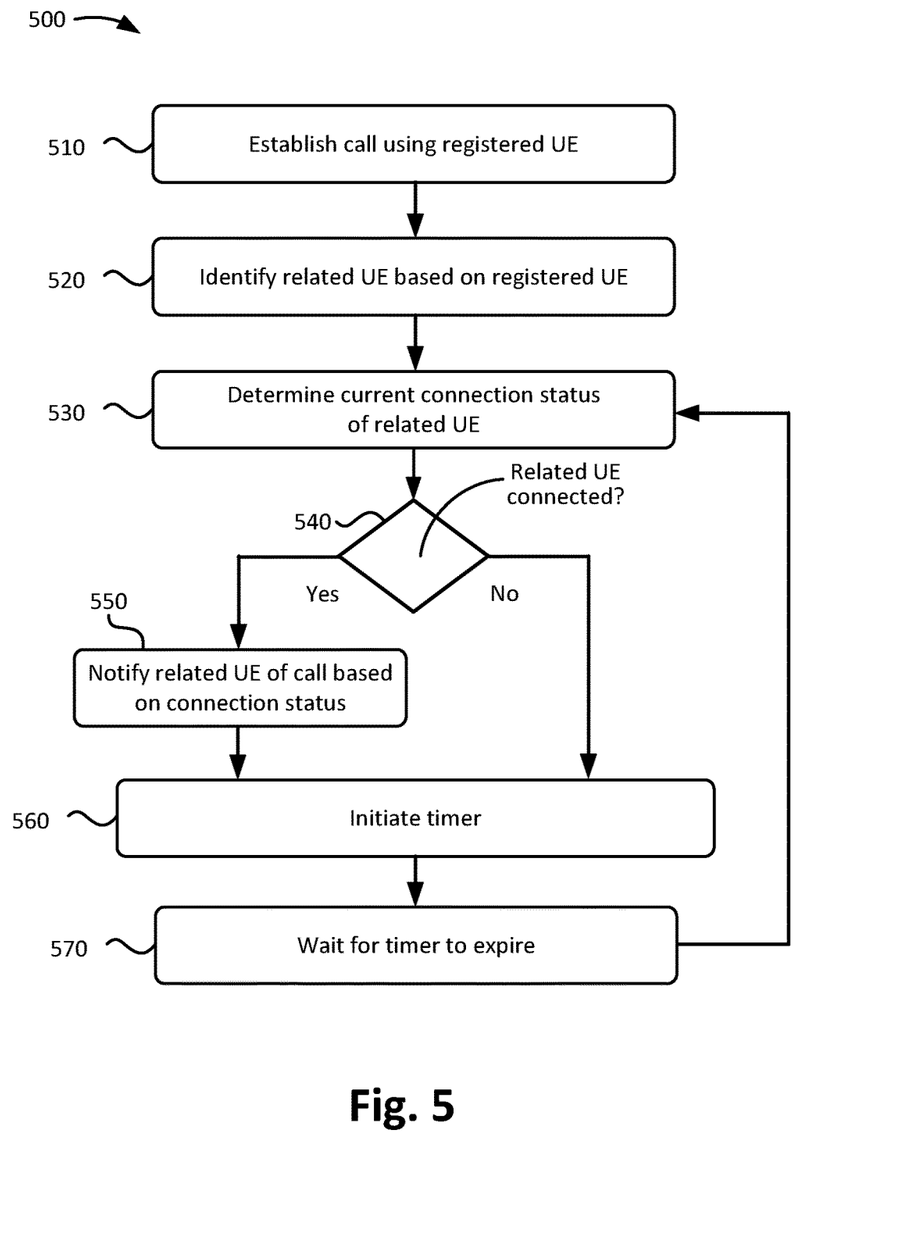
FIG. 5 is a flowchart diagram of an example process for notifying a related UE of an ongoing call involving a registered UE.

FIG. 5 is a flowchart diagram of an example process 500 for notifying a related UE 210 of an ongoing call involving a registered UE 210. In some implementations, process 500 may be implemented by TAS 250. In some implementations, process 500 may be implemented by one or more of TAS 250, CSCF 255, and/or one or other devices described above with reference to FIG. 2.

For the purposes of this example, registered UE 210 may include a particular UE 210 (e.g., a smartphone, a tablet computer, etc.) that has been registered for a call transfer service. Additionally, related UE 210 may include another UE 210 that was registered for the call transfer service along with the registered UE 210. For instance, in some implementations, registered UE 210 may be an example of secondary UE 210 (as described herein), while related UE 210 may be an example of primary UE 210 (as is also described herein).

As shown, process 500 may include establishing a call using registered UE 210 (block 510). For example, TAS 250 may assist in establishing a call between two users. The call may include an IP-based call, such as a VoIP call. One of the users may have pre-registered multiple UEs 210 (e.g., a smartphone, a tablet computer, a laptop computer, a wearable device, etc.) with TAS 250 in order for each of the UEs 210 to engage in calls using a MDN (or another type of identifier) of only one of the UEs 210. For example, registered UE 210 may have been previously registered to engage in calls using the MDN of related UE 210.

Process 500 may include identifying related UE 210 based on registered UE 210 (block 520). For instance, TAS 250 may maintain, request, or otherwise have access to, information representing UEs 210 that have been registered together for a call transfer service. In some implementations, during the registration of related UE 210 and registered UE 210, the user may have designated a particular UE 210 (e.g., a smartphone) as a primary UE 210 and one or more other UEs 210 (e.g., a tablet computer, a laptop computer, etc.) as secondary UEs 210. In some implementations, TAS 210 may infer which UEs 210 are primary UEs and which are secondary UEs 210 based on, for example, whether the UE 210 is registered to use the MDN of another UE 210 and/or whether the UE 210 is capable of establishing both IMS-enabled connections (e.g., a 4G connection) and non-IMS-enabled connections (e.g., a 1× connection) with eNB 215.

Process 500 may include determining a current connection status of related UE 210 (block 530). For example, TAS 250 may determine whether related UE 210 is connected to a wireless telecommunications network and/or determine the type of connection that related UE 210 has with the wireless telecommunications network. For instance, TAS 250 may determine whether related UE 210 has a connection that is enabled for IMS services or that is not enabled for IMS services. A connection that is enabled for IMS services may include a connection that causes UE 210 to automatically register with an IMS core for IP-based calls (e.g., VoIP calls). An example of an IMS-enabled connection may include a 4G LTE connection with the wireless telecommunications network. By contrast, a non-IMS-enabled connection may include a connection that does not cause UE 210 to automatically register with an IMS core for IP-based calls. For example, a non-IMS-enabled connection may include a 1× connection, a 2G connection, or a 3G connection.

When related UE 210 is connected (block 540—Yes), process 500 may include notifying related UE 210 of the call based on the connection status (block 550). For instance, when related UE 210 includes an IMS-enabled connection with the wireless telecommunications network, TAS 250 may use a SIP message to inform related UE 210 of the ongoing call and/or to indicate to the user of related UE 210 that the call may be transferred from registered UE 210 to related UE 210. By contrast, when related UE 210 includes a non-IMS-enabled connection with the wireless telecommunications network, TAS 250 may use another type of data structure and/or protocol (e.g., other than SIP) to inform related UE 210 of the ongoing call and/or to indicate to the user of related UE 210 that the call may be transferred from registered UE 210 to related UE 210. For instance, TAS 250 may use a SMS message or another type of data structure (and corresponding protocol) to inform related UE 210 about the call. In some implementations, regardless of the data structure and/or protocol used to notify related UE 210, the notification may be displayed to the user in the same way (e.g., via an application or other software already installed on related UE 210 for managing calls and/or transferring calls between UEs 210 of the user).

In some implementations, when related UE 210 currently has a connection capable of receiving the notification in more than one way (e.g., via SMS message) TAS 250 may determine the most appropriate way of notifying related UE 210 based on, for example, a prioritized list of message types (e.g., where a different type of message is preferred over a SMS message), current network conditions (e.g., so as to avoid unnecessary network congestion), user preferences (e.g., so the user is not charged for a SMS message when another type of message could be used), etc. In some implementations, the notification may be displayed to the user as if the notification were sent via SIP (e.g., via an application or other software already installed on related UE 210 for managing calls and/or transferring calls between UEs 210 of the user). As such, TAS 250 may dynamically determine different possible ways of contacting related UE 210, identifying a preferred way to contact related UE 210, and do so in a manner that always appears the same to the user.

When related UE 210 is not connected (block 540—No) or when a notification is sent to related UE 210 regarding the call (block 550), process 500 may include initiating a timer (block 560). For instance, TAS 250 may initiate a timer in response to notifying related UE 210 of an ongoing call and/or an ability of the user to have the call transferred to related UE 210. In some implementations, the timer may include a pre-selected duration of time. In some implementations, TAS 250 may dynamically determine the length of the timer based on one or more factors. For instance, if related UE 210 is not connected, the duration of the timer may be relatively short so that if/when related UE 210 becomes connected TAS 250 may notify related UE 210 of the call shortly thereafter.

As another example, if a signal strength and/or quality reported by related UE 210 exceeds a pre-selected threshold, the duration of the timer may be relatively long since the signal strength and/or quality may suggest that related UE 210 may be likely to remain connected. By contrast, if a signal strength and/or quality reported by related UE 210 is below a pre-selected threshold, the duration of the timer may be relatively short since the signal strength and/or quality may suggest that related UE 210 may be unlikely to remain connected (a shorter duration in such a scenario may enable TAS 250 to remain up-to-date as to whether the call may be transferred to related UE 210). In some implementations, if related UE 210 is notified of an ongoing call but cannot maintain the connection to the wireless telecommunications network, related UE 210 may inform the user that the call is no longer capable of being transferred from registered UE 210 to related UE 210.

Process 500 may include waiting for the timer to expire (block 570). For example, TAS 250 may wait for the timer to expire and, once the timer has expired, determine the connection status of related UE 210 (block 530). In this manner, process 300 may provide a technique for periodically identifying the connection statuses of UEs 210 and notifying the UEs 210 regarding the ongoing call. As such, when related UE 210 is not connected to the wireless telecommunications network initially, but at some point thereafter becomes connected, TAS 250 may notify related UE 210 of the ongoing call and/or the option of having the call transferred to related UE 210. Similarly, if related UE 210 is initially connected to the wireless telecommunications network, but at some point thereafter becomes disconnected, related UE 210 may inform the user that the call cannot be transferred until the connection is reestablished, and TAS 250 may periodically determine whether the connection has been reestablished. TAS 250 may inform related UE 210 that the call may again be transferred once the connection is reestablished.

Figure 6:
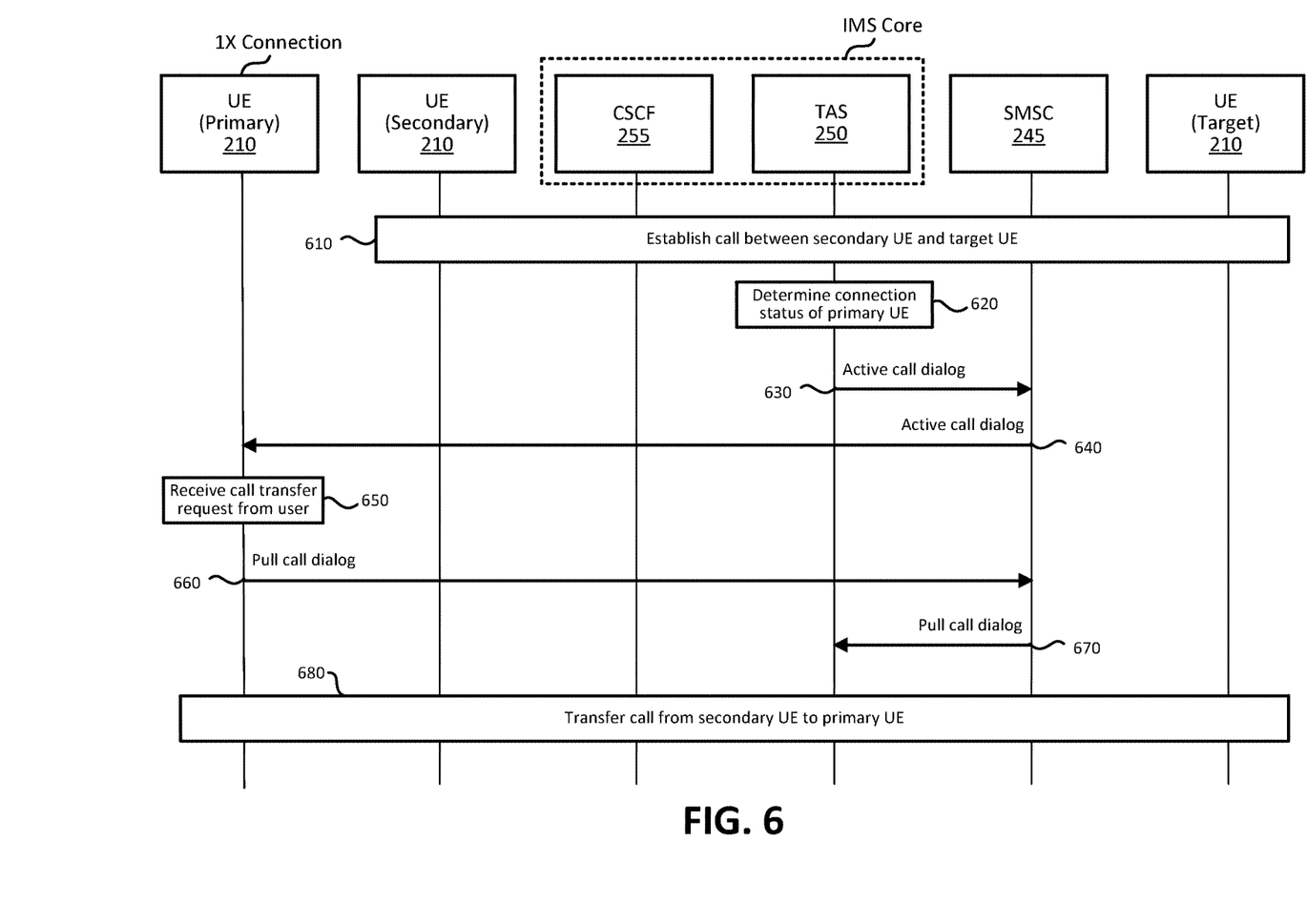
FIG. 6 is a sequence flow diagram of an example for transferring call to a UE.

FIG. 6 is a sequence flow diagram of an example for transferring a call to UE 210. As shown, FIG. 6 includes primary UE 210, secondary UE 210, target UE 210, SMSC 245, TAS 250, and CSCF 255. In some implementations, an example for transferring an IP-based call may include one more additional devices, alternative devices, and/or fewer devices than those depicted in FIG. 6. Similarly, an example transferring an IP-based call may include one or more additional operations, alternative operations, and/or fewer operations than those depicted in FIG. 6.

As shown, SMSC 245, TAS 250, and CSCF may be involved in establishing an IP-based call (e.g., a VoIP call) between secondary UE 210 and target UE 210 (block 610). In some implementations, secondary UE 210 may be using an identity (e.g., an MDN) of primary UE 210 to establish the call, such that, to target UE 210, the call appears to involve primary UE 210 (not secondary UE 210). In response to establishing the call, TAS 250 may determine a connection status corresponding to primary UE 210 (block 620). In some implementations, prior to determining the connection status, TAS 250 may identify primary UE 210 based on an identity (e.g., the MDN of primary UE 210) used by secondary UE 210 to establish the call.

As shown, the connection status of primary UE 210 may include a 1× connection, and as such, TAS 250 may send a request to SMSC 245 for a SMS message (e.g., an active call dialog) to be sent to primary UE 210 regarding the ongoing call (lines 630 and 640). Primary UE 210 may receive the SMS message and inform a user of primary UE 210 that the call may be transferred to primary UE 210. In response to informing the user, primary UE 210 may receive a request from the user to have the call transferred from secondary UE 210 to primary UE 210 (block 650). In response to the request, primary UE 210 may communicate a SMS message (e.g., a pull call dialog) to back to TAS 250 regarding the user's request (lines 660 and 670). The pull call dialog may cause the call to be seamlessly transferred from the secondary UE 210 to primary UE 210 without requiring primary UE 210 to change connections (block 680).

Figure 7:
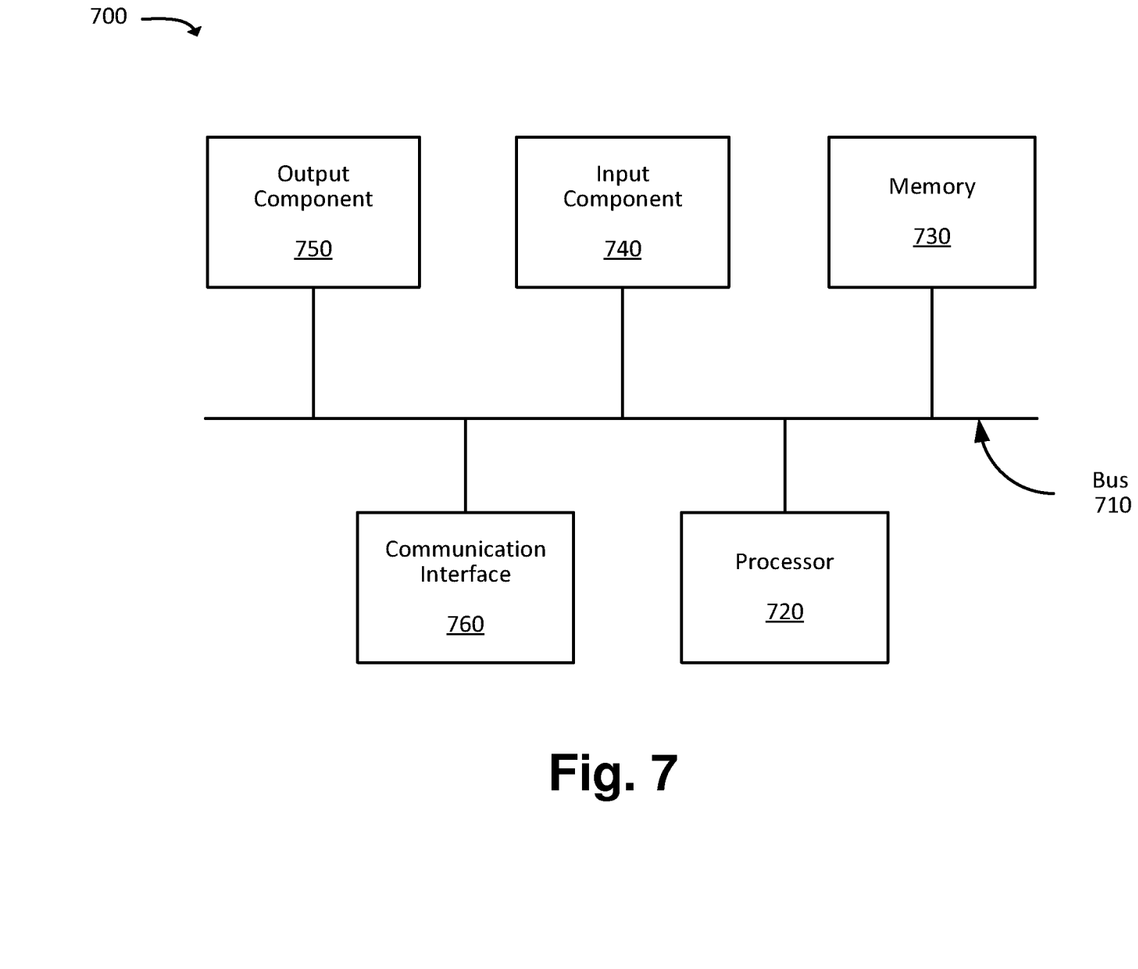
FIG. 7 is a diagram of example components of a device.

FIG. 7 is a diagram of example components of a device 700. Each of the devices illustrated in FIGS. 1, 2, 4, and 6 may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes (LEDs), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of lines, arrows, and/or blocks have been described with regard to FIGS. 3, 5, and 6 the order of the blocks and arrangement of the lines and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
   registering, by a server device, a plurality of user devices, associated with a single mobile device number (MDN), for a service, offered by a wireless telecommunications network, that enables calls to be transferred between the plurality of user devices associated with the single MDN;
   detecting, by the server device, a call involving a first user device, of the plurality of user devices;
   determining, by the server device, whether a second user device, of the plurality of user devices, is connected to the wireless telecommunications network via a connection that supports Internet Protocol (IP) multimedia system (IMS) services;
   when the determination is that the connection supports the IMS services,
      notifying, by the server device and via a Session Initiation Protocol (SIP) message, the second user device regarding the call;
   when the determination is that the connection does not support the IMS services:
      identifying, by the server device, a way of communication, other than using the SIP message, to communicate with the second user device based on the connection between the second user device and the wireless telecommunications network,
      notifying, by the server device, the second user device regarding the call in accordance with the identified way of communication to communicate with the second user device; and
   enabling, by the server device, the second user device to request, based on being notified regarding the call in accordance with the identified way to communicate with the second user device, that the call be transferred from the first user device to the second user device.

2. The method of claim 1, wherein the identifying of the way of communication to communicate with the second user device includes:
   determining a type of connection between the second user device and the wireless telecommunications network,
   identifying a protocol consistent with the type of connection, and
   generating a message, in accordance with the protocol, to notify the second user device regarding the call.

3. The method of claim 2, wherein the notifying of the second user device regarding the call includes communicating, in accordance with the protocol, the message to the second user device.

4. The method of claim 2, wherein:
   when the connection supports the IMS services,
      the connection type includes at least one of:
         a 4th Generation (4G) connection, or
         a WiFi connection, and
   when the connection does not support the IMS services,
      the connection type includes at least one of:
         a 1× connection,
         a 2nd Generation (2G) connection, or
         a 3rd Generation (3G) connection.

5. The method of claim 4, wherein:
   when the connection does not support the IMS services, the message includes a Simple Messaging Service (SMS) message.

6. The method of claim 4, wherein:
when the connection supports the IMS services,
the message includes a Session Initiation Protocol (SIP) message, and when the connection does not support the IMS services,
the message includes a payload of the SIP message, encapsulated in a Simple Messaging Service (SMS) message.

7. The method of claim 1, further comprising:
determining whether the second user device is connected to the wireless telecommunications network,
when the second user device is connected to the wireless telecommunications network,
determining whether the second user device is connected via the connection that supports the IMS services; and
when the second user device is not connected to the wireless telecommunications network,
initiating a timer, and
in response to an expiration of the timer,
subsequently determining whether the second user device is connected to the wireless telecommunications network, and
when subsequently determining that the second user device is connected to the wireless telecommunications network,
determining a type of connection between the second user device and the wireless telecommunications network, and
notifying the second user device of the call based on a type of connection between the second user device and the wireless telecommunications network.

8. The method of claim 7, further comprising:
initiating the timer in response to notifying the second user device regarding the call;
detecting an expiration of the timer;
determining, in response to the expiration of the timer, whether the call was transferred to the second user device prior to the expiration of the timer; and
when the call was transferred prior to the expiration of the timer,
canceling the timer, and
when the call was not transferred prior to the expiration of the timer,
determining whether the second user device is still connected to the wireless telecommunications network.

9. The method of claim 1, wherein the call includes a Voice over IP (VoIP) call.

10. The method of claim 1, further comprising:
in response to notifying the second user device of the call via the SIP message,
determining a type of connection between the second user device and the wireless telecommunications network,
receiving a request, consistent with the type of connection between the second user device and the wireless telecommunications network, from the second user device, to transfer the call from the first user device to the second user device, and
transferring, in response to the request, the call from the first user device to the second user device.

11. A server device, comprising:
a non-transitory memory device storing a plurality of processor-executable instructions; and
a processor configured to execute the processor-executable instructions, wherein executing the processor-executable instructions causes the processor to:
register a plurality of user devices, associated with a single mobile device number, (MDN), for a service, offered by a wireless telecommunications network, that enables calls to be transferred between the plurality of user devices associated with the single MDN;
detect a call involving a first user device of the plurality of user devices;
determine whether a second user device, of the plurality of user devices, is connected to the wireless telecommunications network via a connection that supports Internet Protocol (IP) multimedia system (IMS) services;
when the determination is that the connection supports the IMS services,
notify, via a Session Initiation Protocol (SIP) message, the second user device regarding the call;
when the determination is that the connection does not support the IMS services:
identify a way of communication, other than using the SIP message, to communicate with the second user device based on the connection between the second user device and the wireless telecommunications network,
notify the second user device regarding the call in accordance with the identified way of communication to communicate with the second user device; and
enable the second user device to request, based on being notified regarding the call in accordance with the identified way of communication to communicate with the second user device, that the call be transferred from the first user device to the second user device.

12. The server device of claim 11, wherein, to identify the way of communication to communicate with the second user device, the processor-executable instructions causes the processor to:
determine a type of connection between the second user device and the wireless telecommunications network,
identify a protocol consistent with the type of connection, and
generate a message, in accordance with the protocol, to notify the second user device regarding the call.

13. The server device of claim 12, wherein, to notify the second user device regarding the call, the processor-executable instructions causes the processor to:
communicate, in accordance with the protocol, the message to the second user device.

14. The server device of claim 12, wherein:
when the connection supports IMS services,
the connection type includes at least one of:
a 4th Generation (4G) connection, or
a WiFi connection, and
when the connection does not support the IMS services,
the connection type includes at least one of:
a 1× connection,
a 2nd Generation (2G) connection, or
a 3rd Generation (3G) connection.

15. The server device of claim 14, when the connection does not support the IMS services, the message includes a Simple Messaging Service (SMS) message.

16. The server device of claim 14, wherein:
when the connection supports the IMS services, the message includes a Session Initiation Protocol (SIP) message, and when the connection does not support the IMS services, the message includes a payload of the SIP message, encapsulated in an Simple Messaging Service (SMS) message.

17. The server device of claim 15, wherein the processor-executable instructions causes the processor to:

in response to notifying the second user device of the call via the SIP message, determine a type of connection between the second user device and the wireless telecommunications network, receive a request, consistent with a type of connection between the second user device and the wireless telecommunications network, from the second user device, to transfer the call from the first user device to the second user device, and transfer, in response to the request, the call from the first user device to the second user device.

18. A server device, comprising:

a non-transitory memory device storing a plurality of processor-executable instructions; and a processor configured to execute the processor-executable instructions, wherein executing the processor-executable instructions cause the processor to:

detect a call involving a first user device, the first user device and a second user device being registered to both use a same particular identifier to make and receive calls;

identify the second user device based on the identifier used by the first user device;

determine a type of connection between the second user device and a wireless telecommunications network;

when the type of connection supports Internet Protocol (IP) multimedia system (IMS) services, use a Session Initiation Protocol (SIP) message to notify the second user device regarding the call;

when the type of connection does not support the IMS services, notify the second user device of the call, using a message other than the SIP message in accordance with a protocol consistent with the type of connection determined;

receive, regardless of whether the type of connection supports the IMS services and in response to the second user being notified of the call, a request to transfer the call from the first user device to the second user device; and cause the call to be transferred in accordance with the request.

19. The server device of claim 18, wherein the processor-executable instructions further cause the processor to:

register, prior to the call, the first user device and the second user device for a service, offered by the wireless telecommunications network, that enables calls to be transferred between the first user device and the second user device.

20. The server device of claim 18, wherein:

when the connection supports the IMS services,
the connection includes at least one of:
a 4th Generation (4G) connection, or
a WiFi connection, when the connection does not support the IMS services, the connection type includes at least one of:
a 1× connection,
a 2nd Generation (2G) connection, or
a 3rd Generation (3G) connection, and when the connection type includes a 1× connection, a 2G connection, or a 3G connection, the second user device is notified of the call via a Simple Messaging Service (SMS) message.

* * * * *